(12) United States Patent
Zongker (10) Patent No.: US 10,814,975 B1
(45) Date of Patent: Oct. 27, 2020

(54) FIXED-WING FLYING DEVICE CONFIGURED TO FLY IN MULTIPLE DIRECTIONS

(71) Applicant: James Dean Zongker, Wichita, KS (US)

(72) Inventor: James Dean Zongker, Wichita, KS (US)

(*) Notice: Subject to any disclaimer, the term of this patent is extended or adjusted under 35 U.S.C. 154(b) by 256 days.

(21) Appl. No.: 15/808,673

(22) Filed: Nov. 9, 2017

Related U.S. Application Data (60) Provisional application No. 62/419,768, filed on Nov. 9, 2016.

(51) Int. Cl.
| | |
|---|---|
| *B64C 31/02* | (2006.01) |
| *B64C 3/16* | (2006.01) |
| *B64C 39/08* | (2006.01) |
| *B64C 3/14* | (2006.01) |

(52) U.S. Cl.
CPC ............ *B64C 31/02* (2013.01); *B64C 3/14* (2013.01); *B64C 3/16* (2013.01); *B64C 39/08* (2013.01); *B64C 2003/146* (2013.01)

(58) Field of Classification Search
CPC .......... B64C 31/02; B64C 3/16; B64C 39/08; B64C 2003/146; B64C 3/14; B64C 2003/145; B64C 2003/148; B64C 3/10
See application file for complete search history.

(56) References Cited

U.S. PATENT DOCUMENTS

| | | | |
|---|---|---|---|
| 3,185,480 A | 5/1965 | Weyman et al. | |
| 4,390,150 A * | 6/1983 | Whitener | B64C 39/08 244/13 |
| 4,560,358 A | 12/1985 | Adler | |
| 4,708,682 A | 11/1987 | Schentrup | |
| 4,722,532 A | 2/1988 | Harris | |
| 5,030,157 A | 7/1991 | Silverglate | |
| 5,332,177 A | 7/1994 | Boyle, Jr. | |
| 6,070,831 A * | 6/2000 | Vassiliev | B64C 1/00 244/117 R |
| 6,565,404 B2 | 5/2003 | Oblack | |
| 6,837,813 B2 * | 1/2005 | Darnell | A63H 33/18 446/46 |
| 8,752,788 B2 | 6/2014 | Tuval | |
| 10,301,016 B1 * | 5/2019 | Bondarev | B64C 9/12 |
| 10,377,488 B1 * | 8/2019 | Reusch | B64C 1/16 |
| 2008/0261481 A1 | 10/2008 | Hom | |

(Continued)

*Primary Examiner* — Rodney A Bonnette
(74) *Attorney, Agent, or Firm* — John Rizvi P.A.

(57) ABSTRACT

A fixed-wing flying apparatus, aircraft, airplane or device is provided which is capable of stably gliding in more than one direction such as backwards, frontward or sideways. The device comprises a plurality of wings arranged around the center of area and defining a space therebetween. Each wing includes an outwardly protruding wall along an outer edge of the wing, which disrupts airflow over the wing flying in front so it is less effective than the wing flying behind, facilitating temporary or long term sustainable speed-seeking glide stability in more than one forward direction without any trim or center of gravity adjustment. The plurality of wings can include two wings, three wings forming a triangle, or four wings forming a square or rectangle. The aircraft can be unpowered, powered, free-flight or controlled. A one-front airplane can also be constructed with very relaxed yaw stability.

20 Claims, 9 Drawing Sheets

(56) References Cited

U.S. PATENT DOCUMENTS

2009/0321582 A1\* 12/2009 Eaton ...................... B64C 23/06
                                                                                     244/215
2013/0320133 A1   12/2013 Ratti et al.
2018/0155017 A1\*  6/2018 Chang ...................... B64C 3/38

\* cited by examiner

FIXED-WING FLYING DEVICE CONFIGURED TO FLY IN MULTIPLE DIRECTIONS

CROSS-REFERENCE TO RELATED APPLICATIONS

This application claims the benefit of U.S. Provisional Patent Application Ser. No. 62/419,768, filed on Nov. 9, 2016, which is incorporated by reference herein in its entirety.

FIELD OF THE INVENTION

The present invention relates generally to flying apparatus or devices, and more particularly, to a fixed-wing flying apparatus or device which is configured to fly in more than one direction by providing the flying device with two or more wings arranged in a spaced-apart configuration with one another and having a protruding wall extending from and along an outer edge of each wing.

BACKGROUND OF THE INVENTION

Heavier-than-air flying apparatus or devices, such as airplanes, are capable of overcoming their natural gravitational attraction to the Earth and flying in the air. For this purpose, such flying apparatus or devices are provided with fixed or moving wings of various designs. As known in aerodynamics, when such a flying apparatus or device is operated or powered to acquire a sufficient speed in relation to surrounding air, the difference in air pressure between air above and beneath the wings pushes the wings upward and causes the apparatus to lift.

As known in aerodynamic physics, airplane wings and airfoils lift well forward of their center of area or centroid (arithmetic mean position of all the points in the wing or airfoil). Furthermore, airplane wings or airfoils require a separate horizontal tail or bent up trailing edge to balance lift and pitching forces to provide an acceptable glide ratio for the airplane. This makes it difficult for a fixed-wing configuration airplane to have a steady glide ratio in directions other than a frontward direction (for example, backwards or sideways) and can complicate stability while flying at extreme yaw or sideslip angles.

More specifically, lift tends to center about ¼ of the way back from the front of a lifting surface, whereas the surface and structure tend to balance at the center of area unless mass is concentrated forward. Thus, there is no single center of gravity position to balance the craft in multiple directions. When the center of gravity is aft of the lift, the craft tends to pitch up. If a craft is spinning like a frisbee on a vertical axis, the craft will roll sideways due to gyroscopic forces. To solve these problems, the forward and aft surfaces can be provided with a negative decalage (be angled down as one moves farther from the center) such that they produce a pitching down moment to keep the front from pitching up. However, this solution is only effective for one exact steady glide speed. Once the craft gets slightly off that ideal steady glide speed, pitch diverges up or down, often in an accelerating fashion.

While airplanes can be trimmed to be "kinetic fliers" (flying nearly level till they approach stall speed), airplanes are customarily trimmed to be "speed-seeking gliders" that pitch up if they go too fast, and down if they go to slow, wherein these up-and-down (or "phugoid") oscillations damp to a steady glide speed and decent angle. Two identical wings set far apart along a fuselage can almost glide in either direction, but do not quite attain speed-seeking stability because their lift is centered slightly forward of the center of the craft. This can be overcome to a degree with a slight negative decalage angle between the wings to hold the nose down, which only works well at one exact glide slope and glide speed. Once the airplane deviates a little from that glide, it keeps diverging into a dive or into a climb leading to a stall.

Accordingly, there is an established need for a flying apparatus or device in which at least one of the aforementioned problems is solved. For example, there is a need for a solution which allows fixed-wing flying apparatus or devices to fly in more than one direction. Preferably, the solution should be applicable to both short-distance and long-distance flying apparatus or devices.

SUMMARY OF THE INVENTION

The present invention is directed to a fixed-wing flying apparatus or device which is configured to fly in more than one direction by providing the flying device with two or more wings arranged in a spaced-apart configuration with one another and having a protruding wall extending from and along an outer edge of each wing. The two or more wings are arranged around the center of area of the flying device. The protruding wall of each wing is configured to disrupt airflow over, and optionally under, the wing when the wing is flying in front, so that the wing less effective than a wing flying behind, allowing the center of lift to be at or near the center of area, thus facilitating temporary or long term sustainable speed-seeking glide stability in more than one forward direction without any trim or center of gravity adjustment. The present invention provides a configuration of multiple non-rotating airplane wings that can glide in two or more specific directions by moving the center of lift to or near the center of area and specifically shaping the leading edge of each wing such that the air flow characteristics of each wing are different depending on the overall flight direction of the airplane. In other words, the invention enables an airplane or other fixed-wing flying device to exhibit speed-seeking (or kinetic) glide capability in more than one flight direction by adding an air dam or wall at the edge of each wing farthest from the center of the craft, such that the leading wings are less effective to shift lift to or very near the center of gravity, also at or very near the center of area of all the wings.

In a first implementation of the invention, a fixed-wing flying apparatus comprises two or more wings arranged in a spaced-apart configuration with one another and oriented towards one another such that at least one space is delimited between the two or more wings. Each wing of the two or more wings is fitted with a wing body having an inner edge facing the at least one space and an outer edge opposite to the at least one space, and a protruding wall arranged along the outer edge of the wing body. The protruding wall forms an angle of substantially 45 to 135°, with an adjacent outer surface of the wing body, and is arranged upward of the wing body and thus configured to disrupt airflow over the wing body when the wing body is flying in front.

In a second aspect, the wall can form an angle of 60 to 120° with the adjacent outer surface of the wing body.

In another aspect, the wall can also be arranged downward of the wing body.

In another aspect, the wall can extend from the outer edge of the wing body.

In another aspect, the wall can be arranged uninterruptedly along a full length of the outer edge of the wing body.

In another aspect, at least one wing of the two or more wings can include a fin extending outward from one or both opposite ends thereof and arranged at an angle with the wing body. In some embodiments, the fin can include an end fin wall extending from an outer perimeter of the end fin forming an angle with an adjacent outer surface of the end fin. In some embodiments, the end fin wall can extend from the wall of the wing.

In another aspect, the flying device can further include a fuselage carrying the two or more wings.

In another aspect, the two or more wings can include two wings arranged facing one another. In some embodiments, the two wings can be parallel to one another.

In another aspect, the two or more wings can include three wings arranged forming a triangle.

In another aspect, the two or more wings can include four wings arranged forming a square or rectangle.

In another aspect, the wing body can be arched.

In another aspect, the wing body can be flat.

In another aspect, the wing body can have a thickened cross-section with curved or flat lower and upper surfaces. For example, the wing body may be cambered, reflexed, etc.

In another aspect, the wing body can be tilted upward, with the outer edge arranged lower than the inner edge.

In another aspect, the wing body can be tilted downward, with the outer edge arranged higher than the inner edge.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a fixed-wing flying apparatus or device with multi-directional flight capability. For this purpose, the apparatus or device is provided with two or more wings arranged around the center of area of the apparatus or device, wherein the wings are fitted with a wall or dam protruding upwardly and optionally downwardly from, and along, an outer perimeter of the wing.

Figure 1:
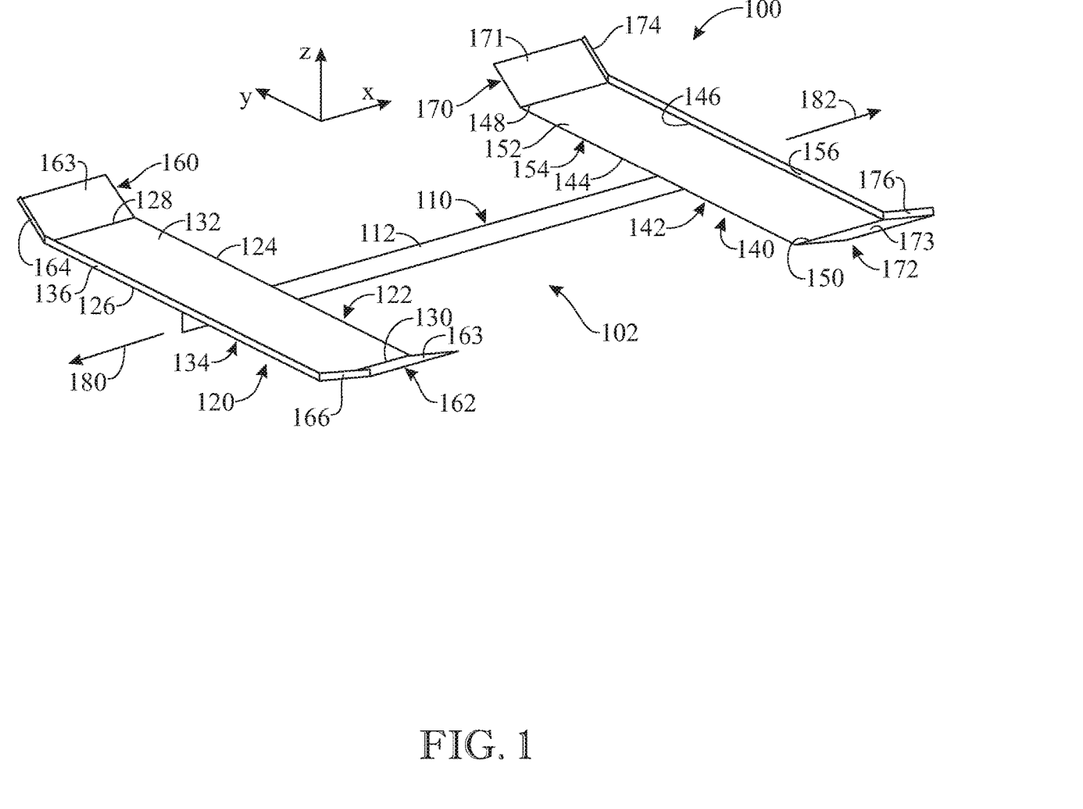
FIG. 1 presents a perspective view of a flying device in accordance with a first illustrative embodiment of the invention.

Referring initially to FIG. 1, a fixed-wing flying apparatus or device 100 (hereinafter referred to generally as flying device 100) is shown, in accordance with a first embodiment of the present invention. The flying device 100 comprises a fuselage 110 carrying a pair of wings comprising a first wing 120 and a second wing 140. In the present embodiment, the fuselage 110 comprises a single, elongated fuselage body 112 extending along a longitudinal direction x of the flying device 100. In some embodiments, such as the present embodiment, the fuselage body 112 can be arranged beneath the wings 120, 140, as shown.

The first wing 120 comprises an elongated, first wing body 122 extending along a transverse direction y which is perpendicular to the longitudinal direction x. The first wing body 122 comprises an inner perimeter or edge 124 and an outer perimeter or edge 126, wherein the inner edge 124 is closer to the space 102 and to the second wing 140 than the outer edge 126, i.e. the outer edge 126 is oriented away from the space 102 and second wing 140. The first wing body 122 further includes a first transverse end 128, an opposite, second transverse end 130, a top surface 132 and an opposite, bottom surface 134. Similarly, the second wing 140 comprises an elongated second wing body 142 extending along the transverse direction y. The second wing body 142 comprises an inner perimeter or edge 144 and an outer perimeter or edge 146, which are closer and farther to the first wing 120, respectively. The second wing body 142 further includes a first transverse end 148, an opposite, second transverse end 150, a top surface 152 and an opposite, bottom surface 154. In some embodiments, the fuselage body 112 can be affixed to the bottom surfaces 134 and 154 of the first and second wings 120 and 140, respectively. The first and second wing bodies 122, 142 are arranged in a spaced-apart configuration with one another such that they at least partially face one another and define a space 102 therebetween. In some embodiments, such as the present embodiment, the first and second wing bodies 122 and 142 can be generally parallel to one another. In the present embodiment, the first and second wings 120 and 140 are perpendicular to the fuselage 110; however, alternative embodiments are contemplated in this regard. For example, the wings may instead be swept forward or rearward, tapered at tip or root, etc.

As further shown in FIG. 1, the first wing 120 further comprises a protruding dam or wall 136 extending upward from and along the outer edge 126 of the first wing body 122. The protruding wall 136 forms an angle of substantially 45 to 135° (and more preferably, of substantially 60 to 120°) with an adjacent outer surface of the first wing body 122. For example, in the present embodiment, the protruding wall 136 extends upwardly from the first wing body 122 and forms an angle of approximately 90° with the top surface 132 of the first wing body 122. Similarly, the second wing 140 further comprises a protruding dam or wall 156 extending from and along the outer edge 146 of the second wing body 142. The protruding wall 156 forms an angle of substantially 45 to 135° (and more preferably, of substantially 60 to 120°) with an adjacent outer surface of the second wing body 142. For example, in the present embodiment, the protruding wall 156 extends upwardly from the second wing body 142 and forms an angle of approximately 90° with the top surface 152 of the second wing body 142. In some embodiments, as in the present embodiment, the walls 136 and 156 extend uninterruptedly along the full length of the outer edge 126 and 146 of the first and second wings 120 and 130, respectively, i.e. from opposite ends of the outer edge 126 and 146.

The two-wing configuration and opposite, outer edge, two-wall configuration provided by the walls 136 and 156 allow the flying device 100 of the present embodiment to fly in two alternative directions 180 and 182. When the flying device 100 glides in a first direction 180, the end of the flying device 100 closer to the wall 136 of the first wing 120 constitutes the front of the flying device 100. When flying in the second direction 182, the end of the flying device 100 closer to the wall 156 of the second wing 140 constitutes the front of the flying device 100. The protruding walls 136 and 156 are configured to disrupt airflow over the wing 120 or 140 flying in front so it is less effective than the wing 140 or 120 flying behind. In some embodiments in which the wing bodies 122, 142 are arranged at a decalage angle as shown for instance in the fourth alternative of FIG. 14 (shown in an upright position 930 and in an inverted position 930'), this disruption of airflow over the wing 120 or 140 flying in front so it is less effective than the wing 140 or 120 flying behind allows the center of lift of the flying device 100 to be at or near the center of area, facilitating temporary or long term sustainable speed-seeking glide stability in both forward directions without any trim or center of gravity adjustment.

In the present embodiment, the flying directions 180 and 182 are opposite to one another and parallel to the longitudinal direction x. The two-front configuration of the present embodiment has both a transverse and a longitudinal symmetry; however, alternative embodiments are contemplated in which the flying device may be asymmetrical in any direction.

In some embodiments, the first wing 120 of the flying device 100 of FIG. 1 can further include a first end fin 160 and an opposite, second end fin 162 extending transversely outward from the first transverse end 128 and second transverse end 130 of the first wing body 122, respectively. The first and second end fins 160 and 162 of the first wing 120 can form an angle with an adjacent surface of the first wing body 122. For example, the first and second end fins 160 and 162 of the first wing 120 of the present embodiment extend upward and outward in a sloped or flared arrangement, forming an angle between 90 and 180° with the top surface 132 of the first wing body 122. In some embodiments, an end fin wall 164 can extend from an outer perimeter of the first end fin 160 forming an angle of substantially 45 to 135° (and more preferably, of substantially 60 to 120°) with an adjacent outer surface of the first end fin 160 (e.g., a top surface 161 of the first end fin 160). Alternatively or additionally, an end fin wall 166 can extend from an outer perimeter of the second end fin 162 forming an angle with an adjacent outer surface of the second end fin 162 (e.g., a top surface 163 of the second end fin 162). In some embodiments, each end fin wall 164, 166 can extend from the wall 136 of the first wing 120, as shown for instance in FIG. 1.

Similarly, the second wing 140 of the flying device 100 of FIG. 1 can further include a first end fin 170 and an opposite, second end fin 172 extending transversely from the first transverse end 148 and second transverse end 150 of the second wing body 142, respectively. The first and second end fins 170 and 172 of the second wing 140 can form an angle with an adjacent surface of the second wing body 142. For example, the first and second end fins 170 and 172 of the second wing 140 of the present embodiment extend upward and outward in a sloped or flared arrangement, forming an angle between 90 and 180° with the top surface 152 of the second wing body 142. In some embodiments, an end fin wall 174 can extend from an outer perimeter of the first end fin 170 forming an angle with an adjacent outer surface of the first end fin 170 (e.g., a top surface 171 of the first end fin 170). Alternatively or additionally, an end fin wall 176 can extend from an outer perimeter of the second end fin 172 forming an angle of substantially 45 to 135° (and more preferably, of substantially 60 to 120°) with an adjacent outer surface of the second end fin 172 (e.g., a top surface 173 of the second end fin 172). In some embodiments, each end fin wall 174, 176 can extend from the wall 156 of the second wing 140, as shown for instance in FIG. 1.

While not shown in the drawing, the flying device 100 may further incorporate elements such as dihedral, winglets and/or tails to enhance roll and yaw stability.

Figure 2:
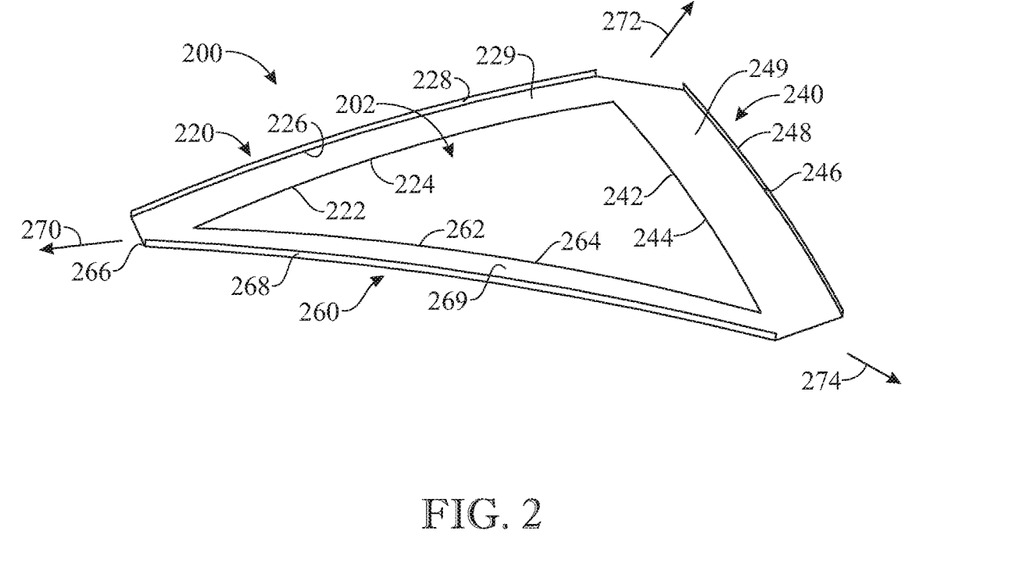
FIG. 2 presents a perspective view of a flying device in accordance with a second illustrative embodiment of the invention.
Figure 3:
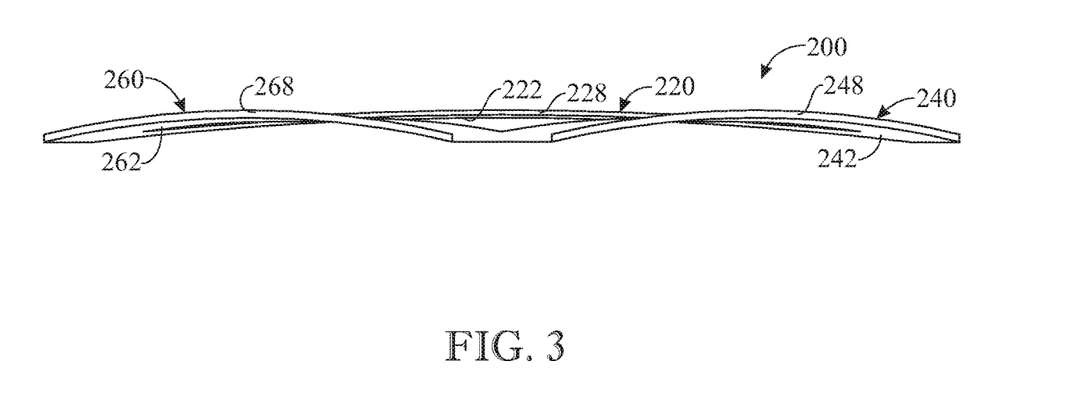
FIG. 3 presents a side view of the flying device of FIG. 2.

The illustrations of FIGS. 2 and 3 show a flying device 200 in accordance with a second illustrative embodiment of the invention. The flying device 200 of the present embodiment comprises a set of three wings including a first wing 220, a second wing 240 and a third wing 260. The first wing 220 comprises a first wing body 222. The second wing 240 comprises a second wing body 242. The third wing 260 comprises a third wing body 262. The first, second and third wing bodies 222, 242 and 262 are arranged in a spaced-apart configuration with one another such that they at least partially face one another forming a triangular arrangement and defining a space 202 therebetween. The first wing body 222 comprises an inner perimeter or edge 224 and an outer perimeter or edge 226, wherein the inner edge 224 is closer to the remaining wings 240, 260 and to the space 202 than the outer edge 226. In turn, the second wing body 242 comprises an inner perimeter or edge 244 and an outer perimeter or edge 246, wherein the inner edge 244 is closer to the remaining wings 220, 260 and to the space 202 than the outer edge 246. Similarly, the third wing body 262 comprises an inner perimeter or edge 264 and an outer perimeter or edge 266, wherein the inner edge 264 is closer to the remaining wings 220, 240 and to the space 202 than the outer edge 266.

As further shown in FIG. 2, the first wing 220 further comprises a protruding dam or wall 228 extending from and along the outer edge 226 of the first wing body 222. The protruding wall 228 forms an angle of substantially 45 to 135° (and more preferably, of substantially 60 to 120°) with an adjacent outer surface of the first wing body 222. For example, in the present embodiment, the protruding wall 228 extends upwardly from the first wing body 222 and forms an angle of approximately 90° with a top surface 229 of the first wing body 222. Similarly, the second wing 240 further comprises a protruding dam or wall 248 extending from and along the outer edge 246 of the second wing body 242. The protruding wall 248 forms an angle of substantially 45 to 135° (and more preferably, of substantially 60 to 120°) with an adjacent outer surface of the second wing body 242. For example, in the present embodiment, the protruding wall 248 extends upwardly from the second wing body 242 and forms an angle of approximately 90° with a top surface 249 of the second wing body 242. In turn, the third wing 260 further comprises a protruding dam or wall 268 extending from and along the outer edge 266 of the third wing body 262. The protruding wall 268 forms an angle of substantially 45 to 135° (and more preferably, of substantially 60 to 120°) with an adjacent outer surface of the third wing body 262. For example, in the present embodiment, the protruding wall 268 extends upwardly from the third wing body 262 and forms an angle of approximately 90° with a top surface 269 of the third wing body 262. In some embodiments, as in the present embodiment, the walls 228, 248 and 268 extend uninterruptedly along the full length of the outer edge 226, 246 and 266 of the first, second and third wings 220, 240 and 260, respectively, i.e. from opposite ends of the outer edges 226, 246 and 266. The flying device 200 of the present embodiment is capable of stably gliding in three directions 270, 272 and 274, with each corner of the triangular wing arrangement configured to alternately serve as a front. Flight tests have also demonstrated that, if stalled in a steep climb or bank, the flying device 200 of FIG. 2 can resume flight using another corner of the triangle as the new nose or front direction. Furthermore, for each one of the three alternative fronts, the adjacent wings extend rearward in a sweptback arrangement, the sweptback wings providing roll and yaw (directional) stability; thus, the triangular arrangement provides yaw stability for a 3-axis controlled glide. In some embodiments, the wing bodies 222, 242 and 262 can be identically shaped and sized, the wing bodies 222, 242 and 262 forming an equilateral triangle and the three flying directions 270, 272 and 274 oriented 120° relative to one another. However, alternative embodiments are contemplated in which the wings 220, 240, 260 may not be equal and the flying directions 270, 272 and 274 may not be arranged at 120-degree intervals.

In some embodiments, as shown in FIG. 3, the wing bodies 222, 242 and 262, and corresponding walls 228, 248 and 268 may be slightly curved upward. In other words, each wing 220, 240, 260 may be provide with negative decalage created by droop curving each corner of the triangle down, as shown in FIG. 3, to increase the ability of the flying device 200 to recover airplane flight when excessively slowed near level. Flight tests have also demonstrated that the drooped corner configuration of FIG. 3 made from 5" long ½" wide cardstock strips with a 1 mm tall air dam or wall 228, 248, 268 on the outer edges 226, 246, 266 and about 5/32" of droop can sustain a steady glide descending at least 15 vertical feet and if launched a bit too fast or slow or at not quite the correct glide slope, can damp mild phugoid oscillations to a steady glide. Notwithstanding, alternative geometries of the wings 220, 240, 260 are contemplated without departing from the scope of the present disclosure.

Figure 4:
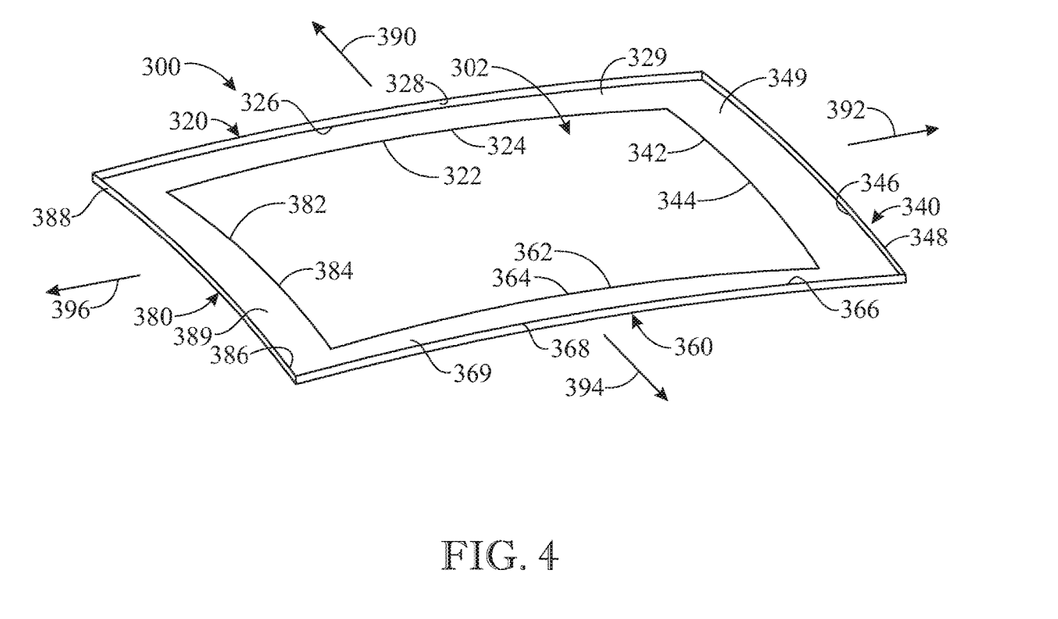
FIG. 4 presents a perspective view of a flying device in accordance with a third illustrative embodiment of the invention.
Figure 5:
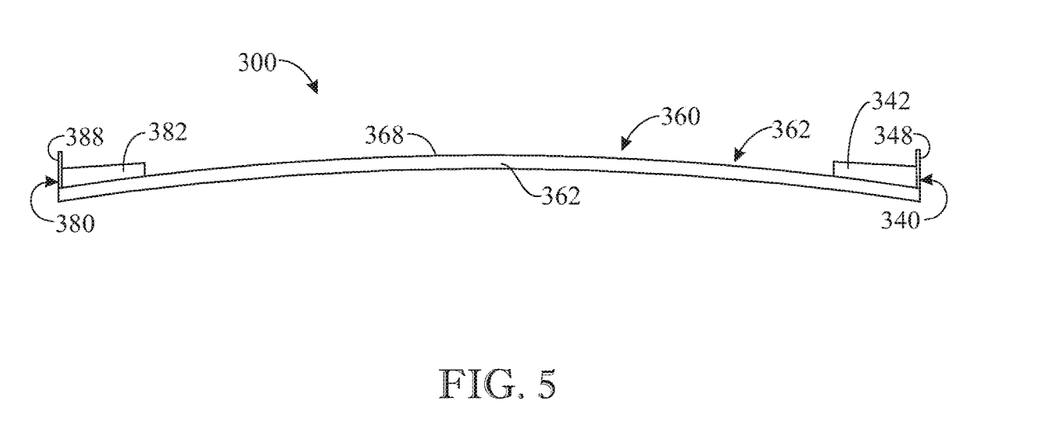
FIG. 5 presents a side elevation view of the flying device of FIG. 4, the section taken along section plane 5-5.

The illustrations of FIGS. 4 and 5 show a flying device 300 in accordance with a third illustrative embodiment of the invention. The flying device 300 comprises a set of four wings including a first wing 320, a second wing 340, a third wing 360 and a fourth wing 380 arranged in a rectangular (right-angled) and spaced-apart configuration delimiting a space 302 therebetween. The first wing 320 comprises a first wing body 322 having an inner edge 324, an outer edge 326, a protruding wall 328 extending along the outer edge 326 (preferably uninterruptedly and along a full length thereof) and forming an angle of substantially 45 to 135° (and more preferably, of substantially 60 to 120°), e.g., 90° as shown, with an adjacent surface of the first wing 320 (a top surface 329 of the first wing body 322). The second wing 340 comprises a second wing body 342 having an inner edge 344, an outer edge 346, a protruding wall 348 extending along the outer edge 346 (preferably uninterruptedly and along a full length thereof) and forming an angle of substantially 45 to 135° (and more preferably, of substantially 60 to 120°), e.g. 90° as shown, with an adjacent surface of the second wing 340 (a top surface 349 of the second wing body 342). The third wing 360 comprises a third wing body 362 having an inner edge 364, an outer edge 366, a protruding wall 368 extending along the outer edge 366 (preferably uninterruptedly and along a full length thereof) and forming an angle of substantially 45 to 135°(and more preferably, of substantially 60 to 120°), e.g. 90° as shown, with an adjacent surface of the third wing 360 (a top surface 369 of the third wing body 362). The fourth wing 380 comprises a fourth wing body 382 having an inner edge 384, an outer edge 386, a protruding wall 388 extending along the outer edge 386 (preferably uninterruptedly and along a full length thereof) and forming an angle of substantially 45 to 135° (and more preferably, of substantially 60 to 120°), e.g. 90° as shown, with an adjacent surface of the fourth wing 380 (a top surface 389 of the fourth wing body 382). In the present embodiment, the four walls 328, 348, 368 and 388 extend to and from one another providing a generally rectangular wall or dam, if observed in top plan view. Similarly to the previous embodiment, the present embodiment may be provided with upwardly-curved wing bodies 322, 342, 362 and 382 and drooped corners as shown in FIG. 4 and best shown in FIG. 5. The flying device 300 of the present embodiment is configured to fly in four alternative directions 390, 392, 394, 396, which can be arranged at 90° relative to one another, as shown, with the four sides of the rectangle alternately serving as fronts. Flight tests which have been carried out using a square cardstock craft with a flat plate airfoil, upward dam, and corners drooped curved down, as illustrated in FIG. 5, have shown evidence of yaw stability flying with any one of the rectangle sides as a front wing.

Figure 6:
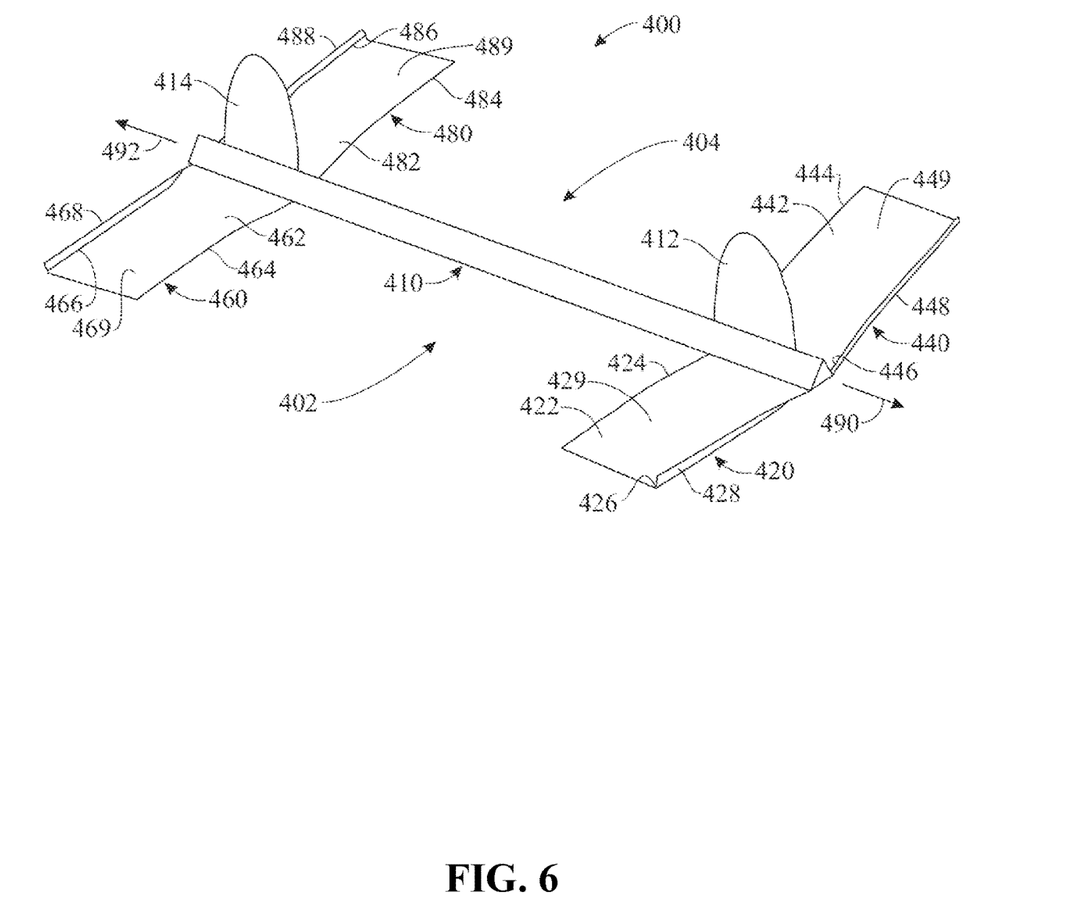
FIG. 6 presents a perspective view of a flying device in accordance with a fourth illustrative embodiment of the invention.
Figure 14:
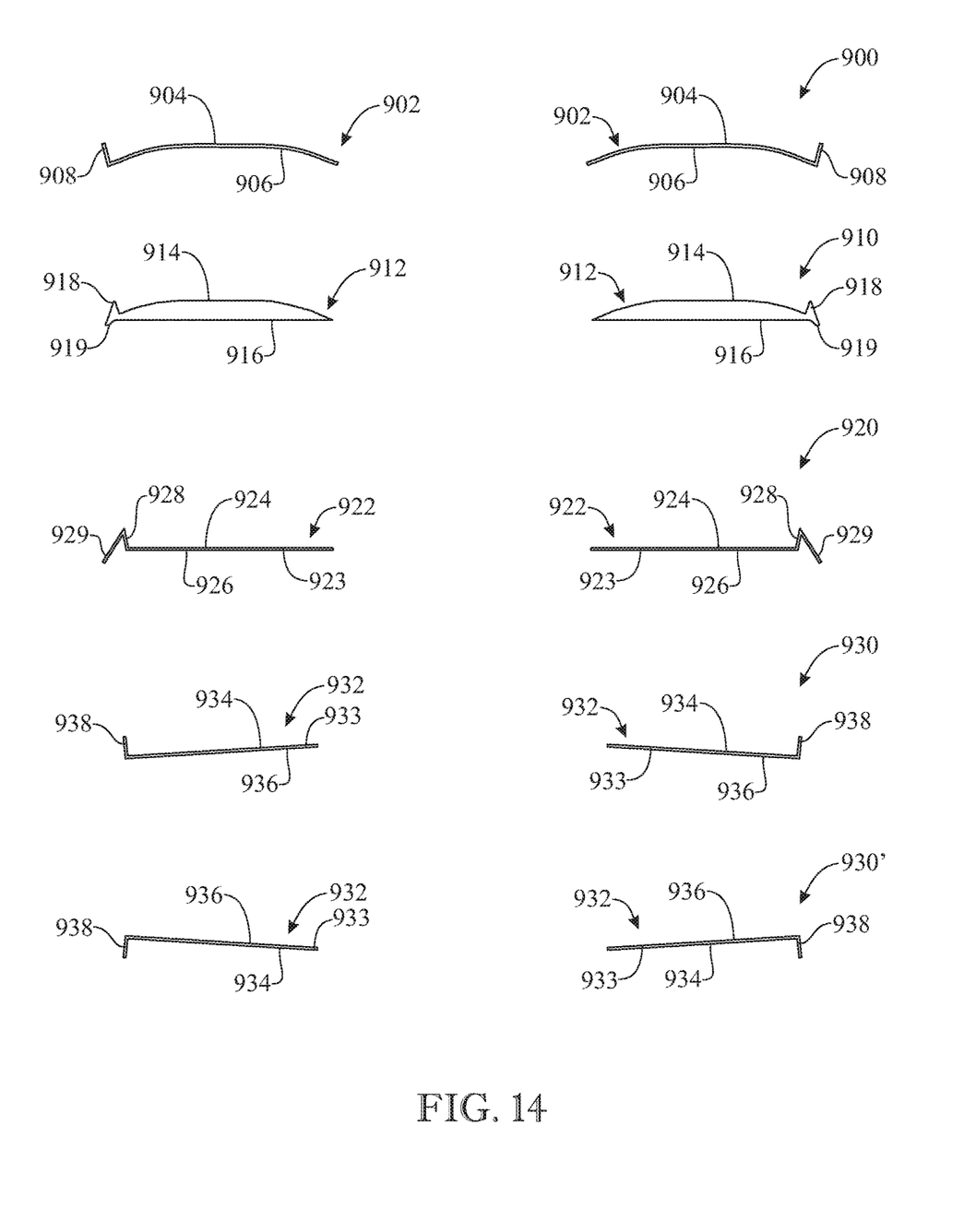
FIG. 14 presents four alternative transverse cross-sections of adjacent or opposite pairs of wings in accordance with different embodiments of the invention, the fourth alternative shown also in an inverted position.

The illustration of FIG. 6 shows a flying device 400 in accordance with a fourth illustrative embodiment of the invention. The flying device 400 comprises a first wing 420, a second wing 440, a third wing 460 and a fourth wing 480 which are carried by a fuselage 410. The wings are arranged in a spaced-apart configuration with one another delimiting at least one space therebetween. More specifically, a first space 402 is defined between the first and third wings 420 and 460 and a second space 404 is defined between the second and fourth wings 440 and 480. Each wing 420, 440, 460 and 480 comprises a respective wing body 422, 442, 462 and 482 having a respective inner perimeter or edge 424, 444, 464 and 484 arranged facing the adjacent space 402, 404 and a respective outer perimeter or edge 426, 446, 466 and 486 arranged opposite to the adjacent space 402, 404. The first and third wing bodies 422 and 462 extend outward and are arranged on a first side of the flying device 400 while the second and fourth wing bodies 442 and 482 are arranged on an opposite, second side of the flying device 100. In some embodiments, the wing bodies 422, 442, 462 and 482 can be substantially flat, as shown. The first and third wing bodies 422 and 462 can be generally parallel (if observed in top plan view). Similarly, the second and fourth wing bodies 442 and 482 can be generally parallel (if observed in top plan view). A protruding dam or wall 428, 448, 468 and 488 extends from and along the outer edge 426, 446, 466 and 486 of the respective wing body 422, 442, 462 and 482 and forms an angle of substantially 45 to 135° (and more preferably, of substantially 60 to 120°), e.g. 90° as shown, with an adjacent outer surface of the wing body 422, 442, 462 and 482, and more specifically, with a top surface 429, 449, 469 and 489 of the respective wing body 422, 442, 462 and 482. In the present embodiments, the walls 428, 448, 468 and 488 extend along the full length of the respective outer edge 426, 446, 466 and 486 and are provided with a non-constant, decreasing height. The fuselage 410 extends above the wing bodies 422, 442, 462 and 482 and is crowned by a front and rear vertical stabilizers or fins 412, 414. This craft can fly in two directions 490, 492 and is able to fly with either side up, i.e., in the position of FIG. 6 and in a vertically-inverted position. Flight tests have determined the craft shown in FIG. 6 with upward pointing air dams or walls 428, 448, 468 and 488 in front of relatively flat cross-section airfoils or wing bodies 422, 442, 462 and 482, as shown, but provided instead with a negative decalage as illustrated in the fourth alternative of FIG. 14, exhibited speed seeking glide behavior with either side up with little or no adjustment of the decalage angle. This suggests the inverted position 930' of FIG. 14 is capable of speed-seeking glide behavior balanced at the center of area, which is an experimental result perhaps not easily explained by classic aerodynamic theory. In the present embodiment, the inner edges 424, 444, 464 and 484 appear curved is because the wings 420, 440, 460 and 480 are twisted as they extend outboard from the fuselage to create a negative decalage angle between the wings, as shown in the 4th row of FIG. 14 (or the 5th row of FIG. 14 when flown inverted). The wings 420, 440, 460 and 480 have dihedral with the tails up as shown in FIG. 6, and anahedral (negative or reverse dihedral that slopes down as they extend outboard) when flown inverted, which is roll stabilized in part by the center of gravity of the craft being below the wings when flown inverted.

Figure 7:
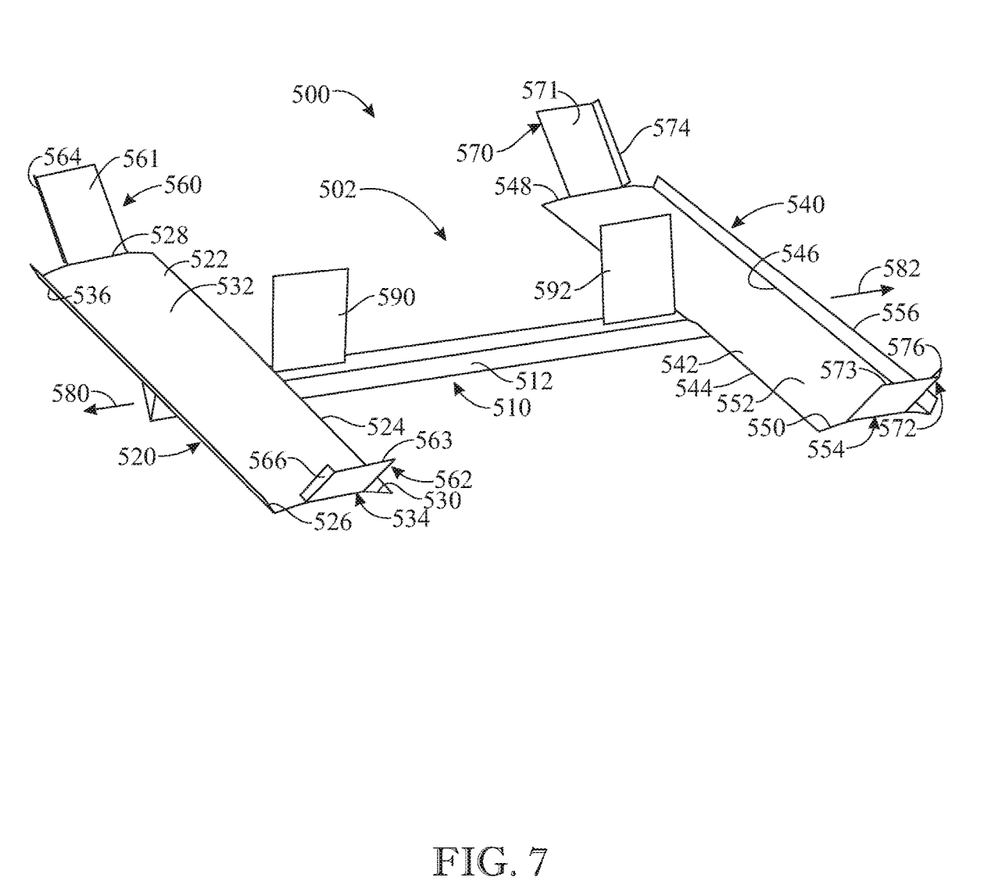
FIG. 7 presents a perspective view of a flying device in accordance with a fifth illustrative embodiment of the invention.

The illustration of FIG. 7 shows a flying device 500 in accordance with a fifth illustrative embodiment of the invention. Like features of the flying device 500 and the flying device 100 of FIG. 1 are numbered the same except preceded by the numeral '5'. Similarly to the flying device 100, the flying device 500 comprises a first wing 520 and a second wing 540 carried by a fuselage 510. The first and second wings 520 and 540 are arranged in a spaced-apart configuration with one another defining a space 502 therebetween. The first wing 520 comprises a first wing body 522 and a protruding wall 536 extending from and along an outer edge 526 of the first wing body 522 and forming an angle of substantially 45 to 135° (and more preferably, of substantially 60 to 120°) with an adjacent outer surface of the first wing body 522. Similarly, the second wing 540 comprises a second wing body 542 and a protruding wall 556 extending from and along an outer edge 546 of the second wing body 542 and forming an angle of substantially 45 to 135° (and more preferably, of substantially 60 to 120°) with an adjacent outer surface (top surfaces 532 and 552) of the second wing body 542. The flying device 500 is configured to selectively fly in one of two longitudinally opposed directions 580 and 582, and can therefore present two alternative fronts.

Unlike the embodiment of FIG. 1, the walls 536 and 556 of the present embodiment form an angle greater than 90° with the adjacent top surfaces 532 and 552, respectively. Another difference with the first embodiment is that the first and second wing bodies 522 and 542 are curved upward such that their top surfaces 532 and 552 are convex and their bottom surfaces 534 and 554 are concave to provide a cambered airfoil, for better gliding performance. Furthermore, the first and second end fins 560, 562, 570 and 572 extend only partially along the transverse edges or ends 528, 530, 548 and 550 of the first and second wing bodies 522 and 542. Yet another difference is that the fuselage 510 is provided with a pair of upwardly-extending fins or stabilizers 590 and 592.

Figure 8:
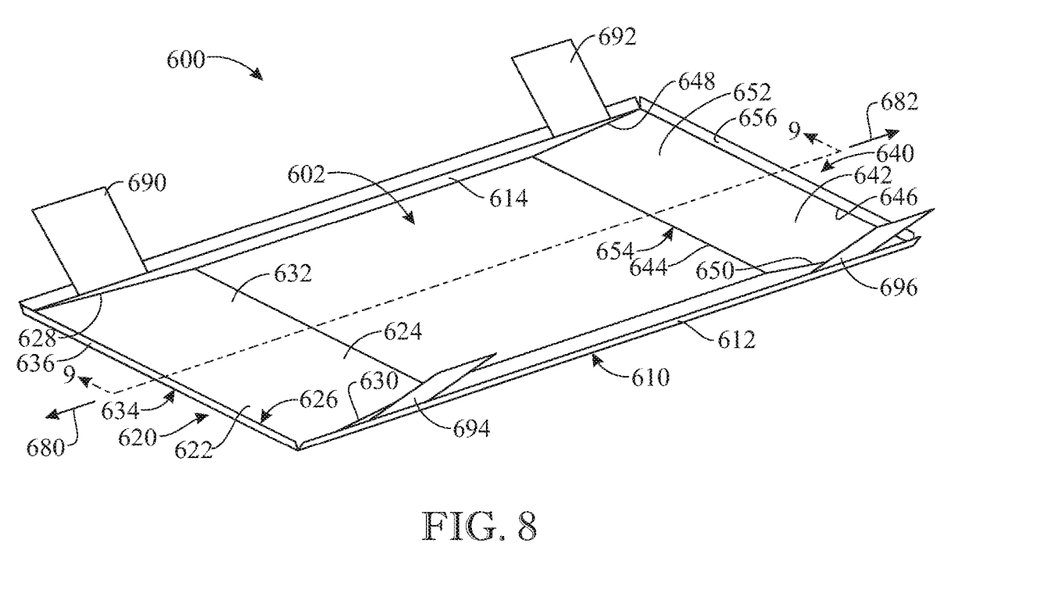
FIG. 8 presents a perspective view of a flying device in accordance with a sixth illustrative embodiment of the invention.
Figure 9:
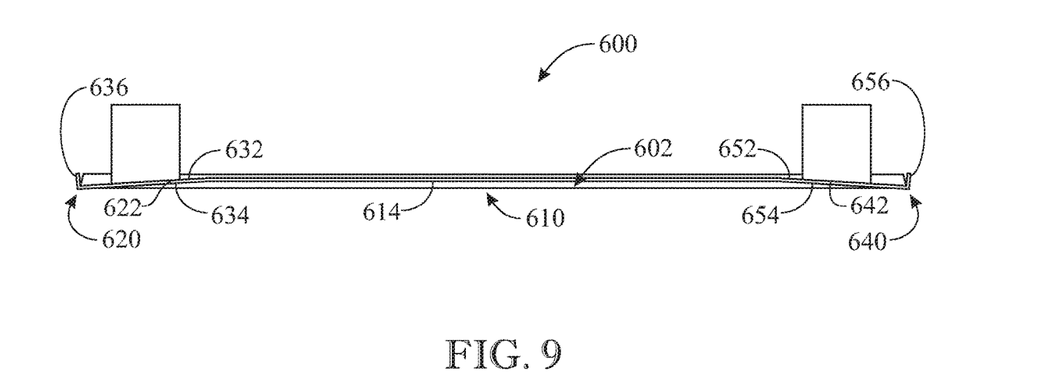
FIG. 9 presents a cross-sectional side elevation view of the flying device of FIG. 8, the section taken along section plane 9-9.

The illustrations of FIGS. 8 and 9 show a flying device 600 in accordance with a sixth illustrative embodiment of the invention. Like features of the flying device 600 and the flying device 100 of FIG. 1 are numbered the same except preceded by the numeral '6'. Similarly to the flying device 100, the flying device 600 comprises a first wing 620 and a second wing 640 carried by a fuselage 610. The first and second wings 620 and 640 are arranged in a spaced-apart configuration with one another and facing one another, thereby defining a space 602 therebetween. The first wing 620 comprises a first wing body 622 and a protruding wall 636 extending from and along an outer edge 626 of the first wing body 622 and forming an angle of substantially 45 to 135° (and more preferably, of substantially 60 to 120°) with an adjacent outer surface of the first wing body 622. Similarly, the second wing 640 comprises a second wing body 642 and a protruding wall 656 extending from and along an outer edge 646 of the second wing body 642 and forming an angle of substantially 45 to 135° (and more preferably, of substantially 60 to 120°) with an adjacent outer surface (top surfaces 632 and 652) of the second wing body 642. The flying device 600 is configured to selectively fly in one of two longitudinally opposed directions 680 and 682, and can therefore present two alternative fronts.

Unlike the embodiment of FIG. 1, the fuselage 610 of the present embodiment comprises two separate fuselage bodies, i.e. a first fuselage body 612 and second fuselage body 614, arranged in a spaced-apart relationship with one another. The first and second fuselage bodies 612 and 614 can be arranged parallel to one another, for instance and without limitation, with the first fuselage body 612 extending between the first transverse ends 628 and 648 of the first and second wing bodies 622 and 642, respectively, and the second fuselage body 614 extending between the second transverse ends 630 and 650 of the first and second wing bodies 622 and 642, respectively. A further difference with the flying device 100 of FIG. 1 is that the top surfaces 632 and 652 of the first and second wing bodies 422 and 442 are not horizontal, but rather sloped downwards towards the walls 636 and 656. Furthermore, the flying device 600 further comprises lateral, sloped fins or stabilizers 690, 692, 694 and 696 protruding from the first and second fuselage bodies 612 and 614. In addition, similarly to the embodiment of FIG. 7, the walls 636 and 656 form slightly more than 90° with the adjacent top surfaces 632 and 652 of the first and second wing bodies 622 and 642, respectively.

Figure 10:
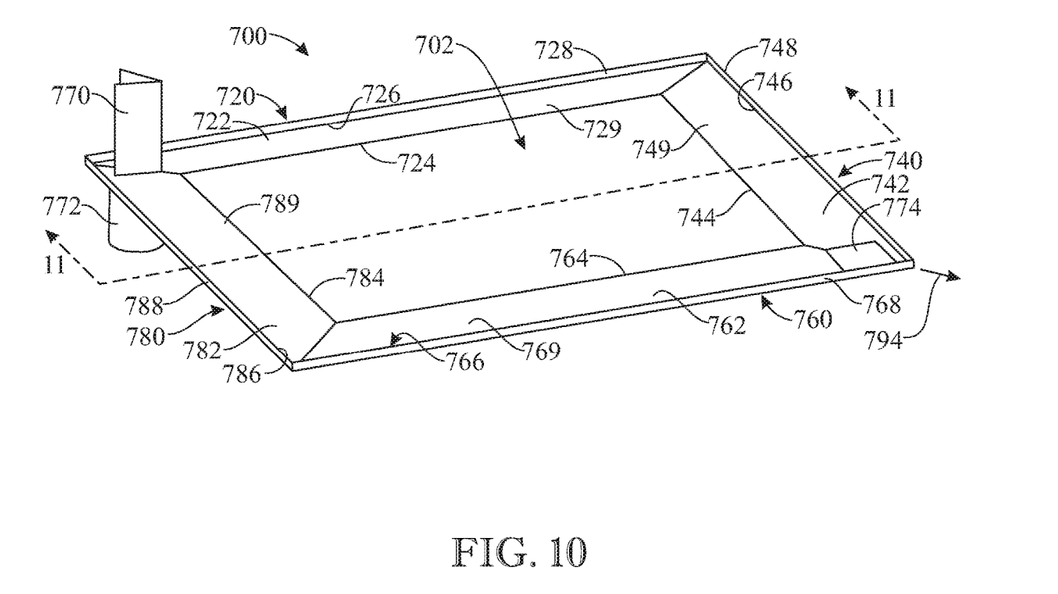
FIG. 10 presents a perspective view of a flying device in accordance with a seventh illustrative embodiment of the invention.
Figure 11:
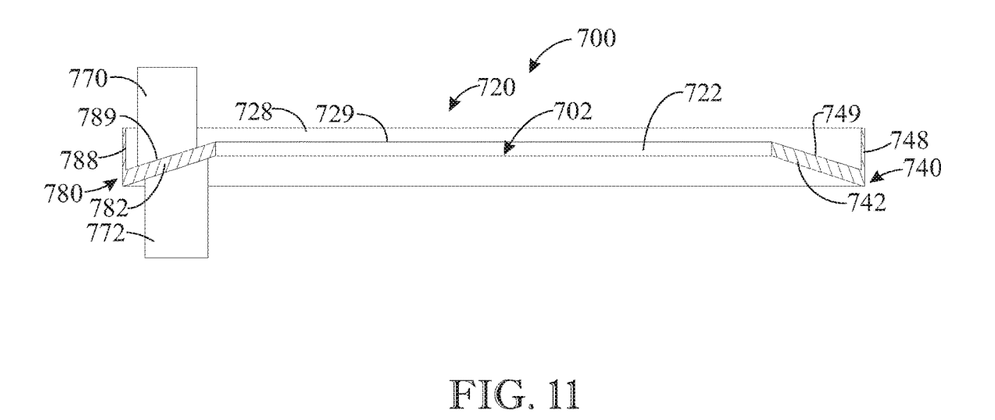
FIG. 11 presents a cross-sectional side elevation view of the flying device of FIG. 10, the section taken along section plane 10-10.

The illustrations of FIGS. 10 and 11 show a flying device 700 in accordance with a seventh illustrative embodiment of the invention. Like features of the flying device 700 and the flying device 300 of FIGS. 4 and 5 are numbered the same except preceded by the numeral '7'. The flying device 700 comprises four wings 720, 740, 760 and 780 arranged in a spaced-apart, right-angled relationship with one another defining a space 702 therebetween, wherein each wing 720, 740, 760 and 780 comprises a generally flat (non-curved and non-drooped) wing body 722, 742, 762 and 782, respectively, and a protruding wall 728, 748, 768 and 788 extending from and along an outer perimeter or edge 726, 746, 766 and 786 of the wing body 722, 742, 762 and 782 and forming an angle of substantially 45 to 135° (and more preferably, of substantially 60 to 120°) with an adjacent outer surface of the wing body. More specifically, the walls 728, 748, 768 and 788 are vertical. In turn, the top surfaces 729, 749, 769 and 789 are sloped upward as shown in FIG. 11 (where the vertical wing and wall dimensions are exaggerated for illustrative clarity), providing the flying device wings a "pyramid" type decalage. The flying device 700 further includes an upwardly protruding drag device 770 and a downwardly-protruding drag device 772 which may serve as tails as the flying device 700 glides in direction 794. For instance and without limitation, the upwardly protruding drag device 770 can be wedge-shaped and the downwardly-protruding drag device 772 can be cylindrical, as shown. The upwardly- and downwardly-protruding drag devices 770 and 772 extend from a corner of the flying apparatus 700, and a weight 774 is provided on the opposite corner in order to balance the flying device 700. In some embodiments, the flying device 700 may lack the upwardly- and downwardly-protruding drag devices 770 and 772; such embodiments may not have any preferred front, and can glide a short distance at any yaw orientation. Tests carried out with 5×5 inch flying devices having the pyramid angle scheme of FIGS. 10 and 11, but lacking the drag devices and balancing weight, have shown that the flying devices were able to fly corner forward for about 3 meters, if they were launched without any yaw rotation.

Figure 12:
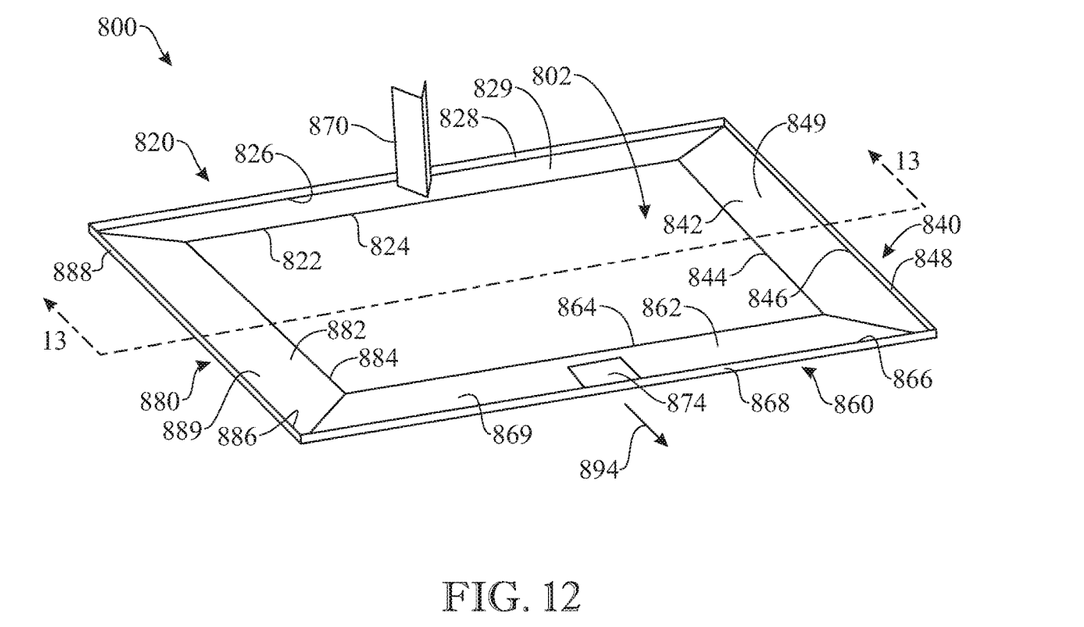
FIG. 12 presents a perspective view of a flying device in accordance with an eighth illustrative embodiment of the invention.
Figure 13:
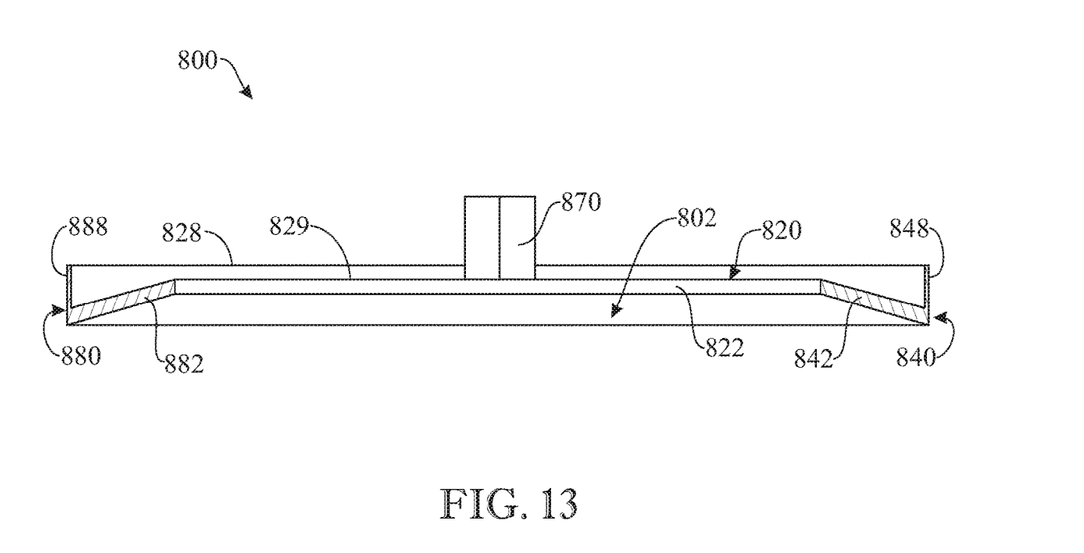
FIG. 13 presents a cross-sectional side elevation view of the flying device of FIG. 12, the section taken along section plane 12-12.

The illustrations of FIGS. 12 and 13 show a flying device 800 in accordance with an eighth illustrative embodiment of the invention. Like features of the flying device 800 and the flying device 700 of FIGS. 10 and 11 are numbered the same except preceded by the numeral '8'. The flying device 800 is different to the flying device 700 of FIGS. 10 and 11 in that there is a single, upwardly-protruding drag device 870 and in that this upwardly-protruding drag device 870 is arranged in a central area of one of the wings (first wing 820), with the balancing weight 874 arranged in a central area of the opposite wing (third wing 860). Flying device 800 prefers to fly in a forward direction 894, but can yaw sideways or even spin around, as described hereinafter. It must be noted that the vertical wing thickness and slope has been exaggerated in FIG. 13 for clarity of the cross section.

Flight tests with a square craft in accordance with the embodiments of FIGS. 10-13, with wings angled down as shown in FIGS. 11 and 13 and fitted with the drag devices on one corner or the center of one side, balanced by adding weight to the opposite corner or side, have demonstrated the ability to glide and maneuver with the drag device acting like a vertical tail at the back end to give the aircraft a weakly preferred forward direction. Such a craft can perform aerobatic maneuvers involving extreme yaw angles including extreme yaw Dutch roll yaw oscillations that damp as it glides forward and decoupled turn maneuvers where the nose direction and flight path are not aligned or turn/rotate in opposite directions. Launching with enough angular momentum can cause the aircraft to momentarily fly backwards, or rotate through 360° or more while flying straight or turning the same or the opposite rotational direction. Flight tests have further demonstrated that craft of this type with greatly relaxed yaw stability are capable of aerobatic maneuvers beyond what is possible with conventional airplanes.

The illustration of FIG. 14 shows four different, non-limiting alternatives of transverse cross-sections of adjacent or opposite pairs of wings in accordance with different implementations of the invention, where the fourth alternative is shown in an upright position and in an inverted position.

In a first alternative 900, the wings 902 are formed as an upwardly-curved or arched sheet and have a convex top surface 904, a concave bottom surface 906 and an upwardly and outwardly oriented wall 908. The arched curvature provides a cambered airfoil shape for a more efficient glide.

In a second alternative 910, the wings 912 are formed as thick airfoils having a convex top surface 914, a flat, horizontal bottom surface 916 (which could alternatively be curved), and a protruding wall comprising an inwardly and upwardly oriented wall portion 918 and an outwardly and downwardly oriented wall portion 919. Alternative embodiments are possible, for instance having the wall vertical or sloped opposite to the drawing, i.e. with the wall portion 918 sloped outwardly and the wall portion 919 sloped inwardly. Shapes of this general type embody an airfoil with thickness to allow structure, and may be more efficient for larger and faster aircraft.

In a third alternative 920, the wings 922 are formed as flat plates having a flat, horizontal top surface 924, a flat, horizontal bottom surface 926, and a zig-zagged protruding wall comprising an upwardly and outwardly oriented wall portion 928 extending from the flat portion of the wing or wing body 923 and an outwardly and downwardly oriented wall portion 929 extending from the wall 928 such that the wall portion 929 extends downward of (i.e. below) the wing body 923. This zig-zag folded leading edge has been conceived as an alternative to bonding a flat plate to the edge that protruded both up and down. The zig-zag allows a single flat sheet of material to create a dam above and below the flat wing, which both disrupts airflow and acts like a crude cambered wing (due to the forward edge being the lower edge). Flight tests showed this allowed sustained long-distance glides with little or no decalage angle, and promise of stable performance inverted.

In a fourth alternative, which is shown in an upright position 930 and in an inverted position 930', the wings 932 are formed as flat plates having flat wing bodies 933 with parallel top and bottom surfaces 934 and 936, and a wall 938 extending from an outer edge of the wing body 933 and forming 90° with the top surface 934 of the wing body 933. When the wings are arranged in the upright position 930, the wing bodies 933 are arranged at a downward decalage angle and the protruding walls 938 extend upward such that they disrupt airflow over the wing flying in front so it is less effective than the wing flying behind. This configuration can also be flown inverted as shown in the inverted position 930', with the flat wing bodies 933 sloped upward and the wall 938 extending downward from the outer edge of the wing bodies 933. Flight tests on the inverted position 930' (carried out by testing flying device 400) have demonstrated this inverted position is capable of a sustained speed-seeking glide, which may be caused by the nearly vertically downward pointed wall 938 creating enough turbulence as air passes over the corner where the wall 938 meets the wing body 943 to reduce lift on the forward wing 932. Thus, it has been demonstrated that the fourth alternative of FIG. 14 in the upright position 930 can be flown in a sustained speed seeking glide either direction, and can be inverted (as indicated by inverted position 930') to fly in either direction again in a sustained speed seeking glide without adjusting trim or balance.

For all the embodiments disclosed herein, flight tests have confirmed that if a craft designed to fly two directions is flown too slow or stalls near level it is prone to settle into a vertically descending deep stall from which it will not recover without trim to drop one wing or power to fly out of the stall. If the craft is flown into a steep climb or other maneuver where a stall can cause either end of the craft to point relatively downwards, it may accelerate and start flying that direction. Furthermore, if the craft is launched significantly differently than a steady glide, flies too fast and pitches up and/or slows too much, it may stall and depart airplane flight, or resume airplane flight in another direction.

Flight tests with 5-inch wingspan cardstock gliders in accordance with the embodiments of FIGS. 1, 6 and 7 have demonstrated self-stabilizing speed seeking behavior in gliding flights descending as much as 15 vertical feet (when the craft is launched in a stead glide, and with launches a bit off the ideal glide that demonstrated phugoid damping behavior).

Flight tests of a flying device such as flying device 300 of FIGS. 4 and 5 (with four wings arranged in a square, curved wing bodies and drooped corners) and alternative non-drooped, pyramid-type four-sided devices, have shown that a controlled glide is possible for short distances (up to about 3 meters with a 5×5 inch square cardstock aircraft), including maneuvers where the flying device yaws one way while flying a turning flight path in the opposite direction.

In summary, the present invention provides a fixed-wing flying apparatus or device with multi-directional flight capability. For this purpose, the apparatus or device is provided with two or more wings arranged around the center of area of the apparatus or device, wherein the wings are fitted with a wall or dam protruding upwardly and optionally downwardly from, and along, an outer edge of the wing. Different embodiments are contemplated with two parallel wings, three wings forming the shape of a triangle, or four wings forming the shape of a square. Flying apparatus or devices provided with three or more wings in accordance with the present disclosure and lacking any vertical fins can also fly like a frisbee or boomerang when thrown with a spin about a central axis perpendicular to the wings.

The present invention may be applied to a variety of flying apparatus, such as, but not limited to, gliding toys made from plastic, composite, foam or cardstock, or flying radio-controlled, powered or unpowered drones. This may include designs that can fly both in an upright orientation (right side up) and in a vertically-inverted orientation (upside down).

Alternative embodiments are contemplated to those depicted herein, without departing from the scope of the present disclosure. For example, aspects of the flying device may vary widely between different embodiments of the invention without departing from said scope; examples of such other aspects are the fuselages connecting the wings, the specifics of other fins, any propulsive devices or systems, control systems (e.g., radio control), payload or the use or application of the flying device. The wings can have one or more polyhedral wing angle changes. The wings may curve more up or down spanwise. The winglets or outer portions may or may not include a dam or protruding wall, depending on what is needed to achieve the desired flight qualities. The shape of the dam and/or airfoil may also vary in different embodiments of the invention. Furthermore, while the devices shown in the figures are simple free-flight craft made of any suitable, stiff lightweight material, so as not to obscure the detailed description of the invention, propulsion or control systems may be added if desired for other applications without departing from the scope of the claims.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A fixed-wing flying apparatus comprising
two or more wings arranged in a spaced-apart configuration with one another and oriented towards one another such that at least one space is delimited between the two or more wings, wherein each wing of the two or more wings comprises
a wing body having an inner edge facing the at least one space and an outer edge opposite to the at least one space, and
a protruding wall arranged upward along the outer edge of the wing body and forming an angle of 45 to 135° with an adjacent outer surface of the wing body, wherein the wall is configured to disrupt airflow over the wing body when the wing body is flying in front of another one of the two or more wings.

2. The flying apparatus of claim 1, wherein the wall forms an angle of 60 to 120° with the adjacent outer surface of the wing body.

3. The flying apparatus of claim 1, wherein the wall is also arranged downward of the wing body.

4. The flying apparatus of claim 1, wherein the wall extends from the outer edge of the wing body.

5. The flying apparatus of claim 1, wherein the wall is arranged uninterruptedly along a full length of the outer edge of the wing body.

6. The flying apparatus of claim 1, wherein at least one wing of the two or more wings comprises a fin extending outward from one or both opposite ends thereof and arranged at an angle with the wing body.

7. The flying apparatus of claim 6, wherein the fin comprises an end fin wall extending from an outer perimeter of the end fin forming an angle with an adjacent outer surface of the end fin.

8. The flying apparatus of claim 7, wherein the end fin wall extends from the wall of the wing.

9. The flying apparatus of claim 1, further comprising a fuselage carrying the two or more wings.

10. The flying apparatus of claim 1, wherein the two or more wings comprise two wings arranged facing one another.

11. The flying apparatus of claim 10, wherein the two wings are parallel to one another.

12. The flying apparatus of claim 1, wherein the two or more wings comprise three wings arranged forming a triangle.

13. The flying apparatus of claim 1, wherein the two or more wings comprise four wings arranged forming a square or rectangle.

14. The flying apparatus of claim 1, wherein the wing body is arched.

15. The flying apparatus of claim 1, wherein the wing body is flat.

16. The flying apparatus of claim 1, wherein the wing body has a thickened cross-section with curved or flat lower and upper surfaces.

17. The flying apparatus of claim 1, wherein the wing body is tilted upward, with the outer edge arranged lower than the inner edge.

18. The flying apparatus of claim 1, wherein the wing body is tilted downward, with the outer edge arranged higher than the inner edge.

19. A fixed-wing flying apparatus comprising two or more wings arranged in a spaced-apart configuration with one another and oriented towards one another such that at least one space is delimited between the two or more wings, wherein each wing of the two or more wings comprises a wing body having an inner edge facing the at least one space and an outer edge opposite to the at least one space, and a protruding wall arranged upward along the outer edge of the wing body and forming an angle of 45 to 135° with an adjacent outer surface of the wing body, wherein the wall is configured to disrupt airflow over the wing body when the wing body is flying in front of another one of the two or more wings to cause the wing flying in front of another of the two or more wings to produce less lift, whereby lift is shifted aft relative to the direction of flight to become centered near the apparatus' center of gravity located at or near the apparatus' center of area in two or more distinct flight directions to facilitate flight in two or more distinct flight directions.

20. A fixed-wing flying apparatus comprising two or more wings arranged in a spaced-apart configuration with one another and oriented towards one another such that at least one space is delimited between the two or more wings, wherein each wing of the two or more wings comprises a wing body having an inner edge facing the at least one space and an outer edge opposite to the at least one space, and a protruding wall extending upward from and arranged uninterruptedly along the outer edge of the wing body, wherein the wall forms an angle of 45 to 135° with an adjacent outer surface of the wing body and is configured to disrupt airflow over the wing body when the wing body is flying in front of another one of the two or more wings.

* * * * *